(12) United States Patent
Bashir

(10) Patent No.: US 12,418,866 B2
(45) Date of Patent: Sep. 16, 2025

(54) UPLINK POWER MANAGEMENT FOR EXTENDED RANGE COMMUNICATION

(71) Applicant: T-MOBILE INNOVATIONS LLC, Overland Park, KS (US)

(72) Inventor: Shahzad Bashir, Snoqualmie, WA (US)

(73) Assignee: T-Mobile Innovations LLC, Overland Park, KS (US)

(*) Notice: Subject to any disclaimer, the term of this patent is extended or adjusted under 35 U.S.C. 154(b) by 621 days.

(21) Appl. No.: 17/742,170

(22) Filed: May 11, 2022

(65) Prior Publication Data

US 2023/0370979 A1    Nov. 16, 2023

(51) Int. Cl.
*H04W 52/28* (2009.01)
*H04W 4/02* (2018.01)
*H04W 52/14* (2009.01)
*H04W 52/36* (2009.01)

(52) U.S. Cl.
CPC ......... *H04W 52/283* (2013.01); *H04W 4/023* (2013.01); *H04W 52/146* (2013.01); *H04W 52/36* (2013.01)

(58) Field of Classification Search
CPC . H04W 52/283; H04W 4/023; H04W 52/146; H04W 52/36; H04W 52/367
See application file for complete search history.

(56) References Cited

U.S. PATENT DOCUMENTS

| | | | |
|---|---|---|---|
| 2015/0215019 A1* | 7/2015 | Bengtsson | H04B 7/063 455/69 |
| 2015/0257158 A1* | 9/2015 | Jadhav | H04W 4/90 455/73 |
| 2020/0314764 A1* | 10/2020 | Noh | H04W 52/146 |
| 2020/0329435 A1* | 10/2020 | Lee | H04W 52/367 |
| 2022/0256473 A1* | 8/2022 | Kiilerich Pratas | H04W 52/367 |

* cited by examiner

*Primary Examiner* — Angelica Perez
(74) *Attorney, Agent, or Firm* — SHOOK, HARDY & BACON L.L.P.

(57) ABSTRACT

Systems and methods are provided for managing maximum uplink transmission power of a UE. Based at least in part on a determination that the UE is greater than a predetermined threshold distance from a user, the maximum uplink power limit is increased from a default level to a higher level to facilitate extended-range communication in the uplink. With a greater maximum uplink power limit, the UE can communicate more effectively in degraded channel conditions or with base stations that are located at greater ranges from the UE, such as extra-terrestrial base stations including satellites.

16 Claims, 4 Drawing Sheets

UPLINK POWER MANAGEMENT FOR EXTENDED RANGE COMMUNICATION

SUMMARY

The present disclosure is directed, in part, to managing uplink power of a wireless device, substantially as shown in and/or described in connection with at least one of the figures, and as set forth more completely in the claims.

In aspects set forth herein, a maximum uplink power for a user equipment (UE) is dynamically modified based on the proximity to a user. Modern UEs optimize uplink transmission power by attempting to use the minimum necessary uplink power to communicate with a selected base station. Signals transmitted with a greater power will reach further and have improved quality based on improved signal to interference noise ratios. The UE may utilize any uplink power up to the maximum uplink power in order to prevent unwanted effects associated with high transmission power levels (both from a potential safety perspective and from an interference avoidance perspective). While typically a maximum uplink power is hard-set into a phone and is not capable of dynamic modification, aspects herein enable a first maximum uplink transmission power to be increased as the proximity of the UE to the user decreases. By increasing the maximum uplink power, the UE may be enable to wirelessly communicate with base stations at extended ranges, such as extraterrestrial base stations, that may have been unreachable at lower uplink power levels or improve the quality of connections with base stations that were within range at the lower uplink power levels.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
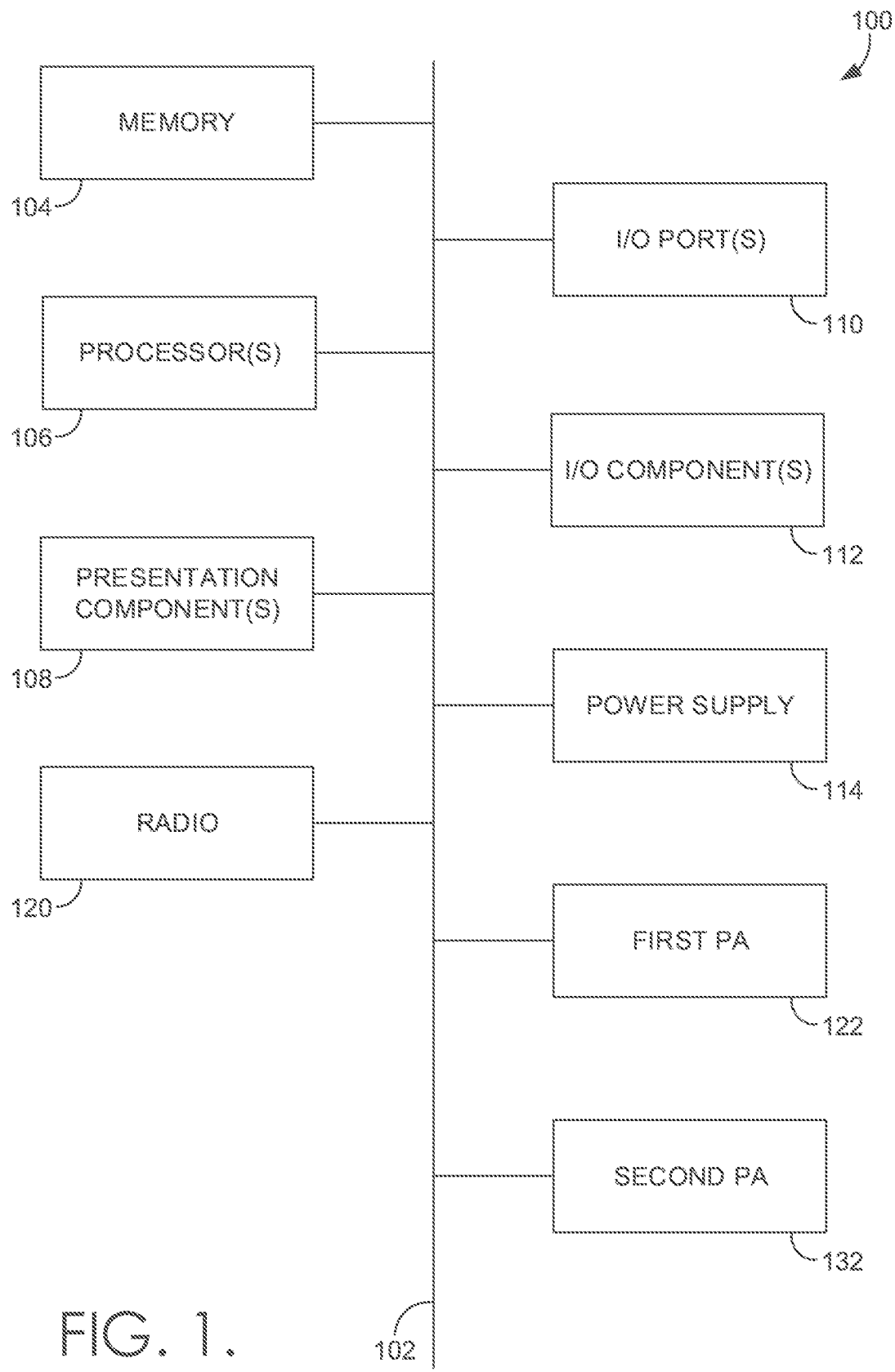
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless telecommunications network employs a plurality of base stations to wirelessly transmit signals to a user device and wirelessly receive signals from the user device. Historically, base stations have been terrestrial (coupled to the earth via a tower or some other structure); however, next generation wireless networks may include extra-terrestrial base stations (e.g., coupled to an aircraft or a satellite). (i.e., cell sites, cell towers) to provide network coverage to a particular area (i.e., cell). The base stations are employed to broadcast and transmit transmissions to user devices of the telecommunications network within the cell. An access point may be considered to be a portion of a base station that may comprise an antenna, a radio, and/or a controller. In aspects, an access point is defined by its ability to communicate with a UE according to a single protocol (e.g., 3G, 4G, LTE, 5G, and the like) and/or a single frequency (or frequency band) in one or more subdivisions (i.e., a sector) of the cell. In other aspects, a single access point may communicate with a UE according to multiple protocols or multiple frequencies. As used herein, a base station may comprise one access point or more than one access point. Factors that can affect the telecommunications transmission include, e.g., location and size of the base stations, frequency of the transmission, among other factors.

Even in modern telecommunication networks, it is not unusual for users to use wireless communication devices in areas with little or no connectivity. In some cases, the lack of connectivity may be owed to an absence of base stations (e.g., terrestrial base stations are uncommon on bodies of water); however, in other cases lack of connectivity may be owed to an inability of user devices to communicate in the uplink with base stations. Owing to the fact that base stations can transmit in the downlink with significantly greater power, it is not uncommon for user devices to have difficulty attaching or maintaining a connection with a base station, particularly when there are adverse channel conditions (e.g., high noise, adverse atmospheric conditions that negatively affect RF propagation, and the like) or when the user device is at or beyond the cell edge based on default limits on the maximum uplink power permitted by the UE for uplink transmissions. Compounding this issue, next generation telecommunication systems are likely to include extra-terrestrial base stations, whether airborne or satellites. While the extra-terrestrial base stations may be configured with sufficient power or other components to communicate with user devices at or near (relative to the extra-terrestrial base station) the ground, the user devices may be required to an uplink transmission power that exceeds the restrictions placed on user devices for emissions, based on an assumption that the emissions occur while the user device is proximate to a user.

Accordingly, the present disclosure is directed to systems, methods, and computer readable media that are an improvement over conventional communications between a UE and an access point by facilitating safe and effective communication with base stations at extended range. In accordance with aspects described herein, a maximum uplink power limit that a user device may not exceed in order to communicate with a base station is modified based at least in part on a determination that the user device is at a safe distance from the user. That is, when it is determined that the user device is located greater than a threshold distance from the user, safe emissions at the point of the user may remain the same if both the maximum uplink power transmission of the user device and the distance from the user are increased. By increasing the maximum uplink power limits, the user device may use higher power levels to communicate with base stations that were otherwise inaccessible—whether due to range, channel conditions, or both.

As employed herein, user equipment (UE) (also referenced herein as a user device or wireless communications device (WCD)) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

As used herein, user devices that are spatially distributed with respect to a first and second access point may be said to be in different locations relative to one or more access points. That is, a first device's location may be described herein as being further from a first access point, relative to a second device. Such distance-related terminology may be read to mean a distance at ground level between the ground level of the access point and the ground level of the device, it may refer to the distance actually traveled by the signal (in aspects, affected by multipath, reflection, etc), and/or it may refer to a signal strength (e.g., a first device is further from an access point than a second device based on the downlink signal received at the first device being weaker than the downlink signal received at the second device).

Accordingly, a first aspect of the present disclosure is directed to method for managing uplink maximum transmission power in a user equipment (UE). The method comprises receiving a downlink signal from a base station. The method further comprises determining an uplink power to communicate an uplink signal to the base station. The method further comprises determining that the uplink power is greater than a first maximum power limit associated with handheld operation of the UE and less than a second maximum power limit. The method further comprises determining, using one or more sensors, that the UE is greater than a pre-determined threshold distance to a user. The method further comprises increasing a maximum uplink power limit of the UE from the first maximum power limit to the second maximum power limit.

A second aspect of the present disclosure is directed to a system for managing uplink maximum transmission power in a UE. The system comprises a wireless telecommunication network comprising a plurality of base stations, including a first base station configured to transmit a downlink signal to a user equipment (UE) and receive an uplink signal from the UE. The system further comprises one or more networked computer processing components configured to perform a method comprising communicating a set of downlink signals to the UE. The one or more networked computer processing components are further configured to determine that the UE has not attached to the plurality of base stations. The one or more networked computer processing components are further configured to instruct the UE to utilize an extended-range communication mode, wherein the extended-range communication mode comprises the UE determining that a distance between the UE and a user exceeds a predetermined threshold and increasing a maximum uplink power from a first value to a second value, the second value being greater than the first value. The one or more networked computer processing components are further configured to receive a set of uplink signals at the first base station from the UE while the UE is utilizing the extended-range communication mode.

Another aspect of the present disclosure is directed to one or more non-transitory computer readable media having instructions stored thereon that, when executed by one or more computer processing components, cause a user equipment (UE) to perform a method for managing uplink transmission power. The method comprises receiving a downlink signal from a base station. The method further comprises based at least in part on a determination that a UE is located greater than a predetermined threshold distance from a user, modifying a default maximum uplink power value from a first value to a second value, wherein the second value is greater than the first value. The method further comprises communicating an uplink signal to the base station using an uplink transmission power greater than the first value.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 represent radios that facilitate communication with one or more wireless networks using one or more wireless links. In aspects, the first radio 120 utilizes a first transmitter 122 to communicate with a wireless network on a first wireless link and may utilize the second transmitter 132 to communicate with a wireless network on a second wireless link. Though two radios are shown, it is expressly conceived that a computing device with a single radio (i.e., the first radio 120) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configure dot communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies.

Figure 2:
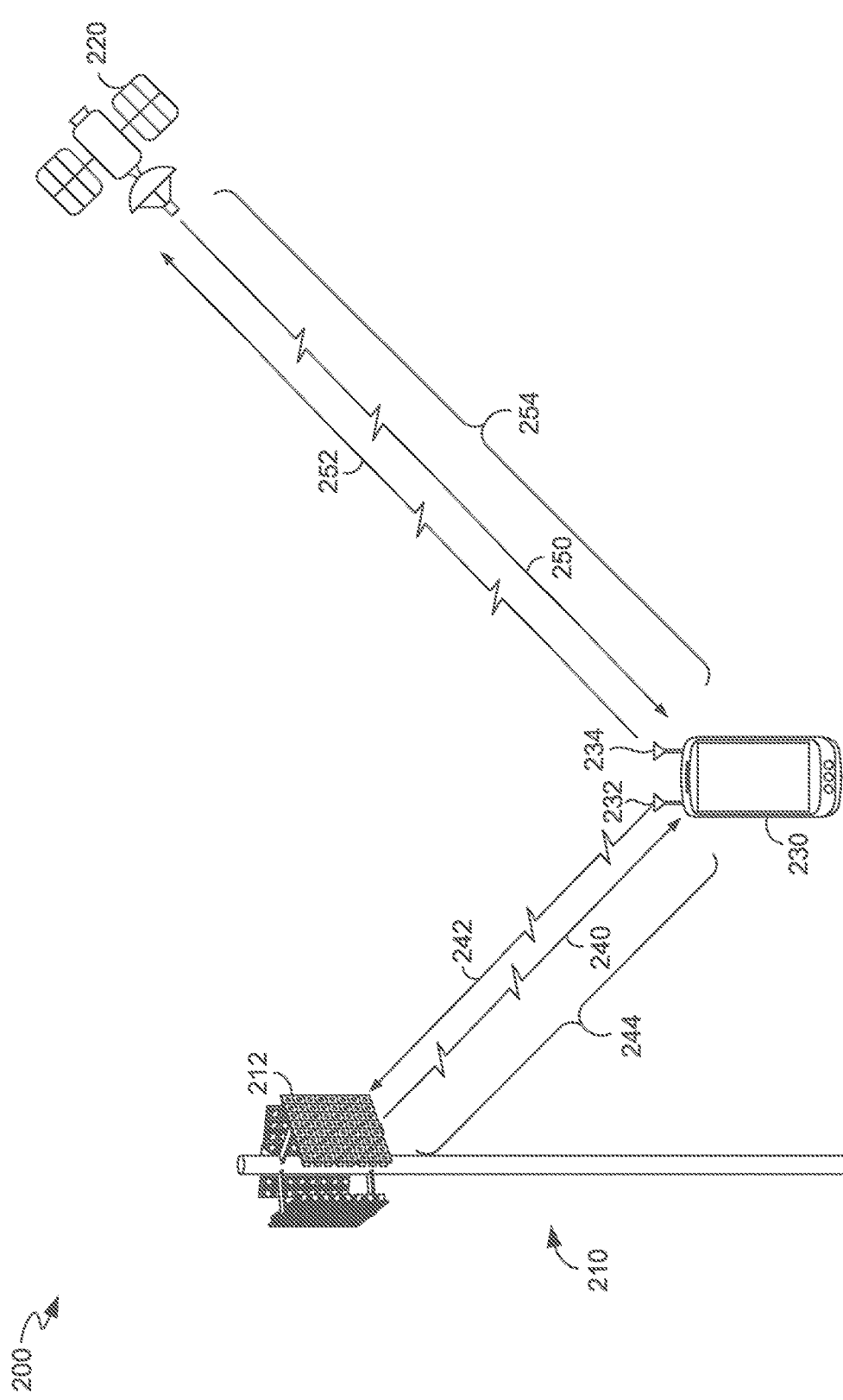
FIG. 2 depicts a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

The network environment 200 includes a user device 230, a first base station 210, and a second base station 220. The user device 230 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network. In some aspects, the user device corresponds to computing device 100 in FIG. 1. Thus, a user device can include, for example, a display(s), a power source(s) (e.g., a battery), a data store(s), a speaker(s), memory, a buffer(s), a radio(s) and the like. The user device 230 comprises a wireless or mobile device with which a wireless telecommunication network(s) can be utilized for communication (e.g., voice and/or data communication); in this regard, the user device can be any mobile computing device that communicates by way of a wireless network, for example, a 3G, 4G, 5G, 6G, LTE, CDMA, or any other type of network.

The network environment 200 may be said to comprise a plurality of base stations such as the first base station 210 and the second base 220. For the purposes of this disclosure, a base station is used in its general sense, being defined as a station for transmitting and receiving RF signals. A suitable base station is not protocol-specific, it may be configured to be any wireless telecommunication protocol that is compatible with the user device 230, such as 4G, 5G, 6G, or any other wireless standard. Base stations consistent with the present disclosure may be configured to serve a certain geographic area (i.e., a cell) and will have one or more backhaul connections that connect it to a broader telecommunications network for the provision of telecommunication service to the user device 230. Base stations suitable for use in the present disclosure may be terrestrial, that is, they are coupled to the earth via a tower or some other structure, such as the first base station 210; alternatively, a suitable base station may be extra-terrestrial, that is coupled to an aircraft or a satellite, such as the second base station 220. In order to connect to a wireless telecommunication network, the user device 230 may be configured to search for and select a base station according to any desirable protocol or process. The user device 230 may be configured to configured for single connectivity (i.e., wirelessly communicate with a single base station using only a first transmitter 232) or may be configured for dual connectivity (i.e., simultaneously or nearly-simultaneously wirelessly communicate with two or more base stations using both the first transmitter 234 and a second transmitter 234).

In aspects where the user device 230 has selected the first base station 210, the user device 230 will receive a first set of downlink signals 240 from the first base station 210 and attempt to communicate a first set of uplink signals 242 across a first distance 244 that exists between the user device 230 and the first base station 210. Additionally or alternatively, the user device 230 may select the second base station 220, in which case the user device 230 will receive a second set of downlink signals 250 from the second base station 220 and attempt to communicate a second set of uplink signals 252 across a second distance 254 that exists between the user device 230 and the second base station 220. For the purposes of the present disclosure, the user device 230 may be said to have a default maximum uplink power, which is defined as the maximum uplink power that may be used to communicate either the first set of uplink signals 242 and/or the second set of uplink signals 252. The default maximum uplink power may be set by device makers or carriers, and is typically at least partially informed by safe radiation limits for radiators in proximity to the human body. For example, in one jurisdiction, a regulating body may require any user device to transmit signals with no more than 26 dBm when it is within six inches of a human body. If the distance between the user device 230 and a selected base station is so great that the maximum uplink power is incapable of effectively communicating signals, then the user device 230 will not be able to attach, connect, or stay connected to the selected base station; for example, if the user device 230 receives the second set of downlink signals 250 and utilizes said signals as a basis for selecting the second base station 220 for attachment, the user device may iteratively attempt to transmit the second set of uplink signals 252 to the second base station 220 with greater and greater power until it reaches the maximum uplink power (in the preceding example, 26 dBm). If the second distance 254 is too great or the conditions along the second distance are too undesirable, the user device 230 may not be able to successfully communicate in the uplink to the second base station 220 even though it can receive the second set of downlink signals 252 therefrom; such an unsuccessful communication may be manifested by a base station such as the first base station 212 or the second base station 220 receiving one or more uplink signals from the UE 230, wherein the one or more uplink signals comprise one or more network parameters below a pre-determined threshold (e.g., signal strength, SINR, dropped packets, or any other desirable indicator).

In order to communicate with base stations at an extended range, the user device 230 may be configured to have a first maximum uplink power when the user device 230 is within a predetermined threshold distance (i.e., proximity) to a user and to have a second maximum uplink power when the user device 230 is greater than the predetermined threshold distance to the user. The user device 230 may utilize a single power amplifier and/or transmitter that is configurable to permit uplink transmission powers at or below a modifiable limit; in other aspects, the user device 230 may comprise a first set of components, including a first power amplifier that include non-configurable uplink transmission power limits that are utilized by the user device 230 when the user device 230 is within the predetermined threshold distance to the user, and a second set of components including a second power amplifier that has a non-configurable uplink transmission power limit greater than that of the first power amplifier, which permits otherwise normal iteratively-increasing uplink transmissions when the distance to the user exceeds the predetermined threshold distance. In other aspects, there may be more than two power amplifiers, wherein each power amplifier is associated with a predetermined maximum transmission power and a distance to the user; for example, a first power amplifier could may have the default transmission power maximum for any distance less than a first threshold, a second power amplifier could have a second maximum transmission power (higher) when the distance is between the first threshold and a second (greater) threshold distance, and a third power amplifier could have a third (yet higher) maximum transmission power when the distance is greater than the second (yet greater) threshold distance. Though the UE 230 may make a determination that it should transmit in high power mode if the distance to the user exceeds a threshold, the UE 230 may be instructed by a component of the network (e.g., the first base station 212 or the second base station 220) that the UE 230 should utilize high-power if/when it is able, based on any desirable set of factors (e.g., one or more uplink connection parameters being lower than a predetermined threshold, time since attachment, absence of other candidate base stations, or the like).

Determining the proximity of the user device 230 may be carried out through the use of a user input, a user's action, one or more proximity sensors, or a combination thereof. In a first aspect, a user input may be used to determine the proximity of the user device 230 to the user; that is, the user may interact with a user interface or physical input of the user device 230 to indicate that the user is moving the user device 230 away from them. Turning to the illustration 300 of FIGS. 3A and 3B, this act is shown by the user 302 moving the user device 230 of FIG. 2 from a first position 304 that is adjacent to the user 302 to a second position 306. In such an aspect, user input may trigger a delay or timer that prevents the maximum uplink power from being modified before the user 302 has an opportunity to move the user device 230 from the first position 304 to the second position 306. In a second aspect, the user may perform a user action that corresponds to a determination that the user device 230 is in the second position 306 instead of the first position 304. In one example, the user action may comprise plugging the user device 230 into a power source, which may be associated with knowledge that the user device 230 is at least a certain distance from the user 302. In another example, the user action may comprise mating or coupling the user device 230 into a docking station, charging pad, or other equipment configured to receive the user device 230 that is associated with knowledge that the user device 230 is greater than a certain distance from the user 302 or in the second position 306 vs. the first position 304. In addition to or as an alternative to using a user's input or a user's action, one or more proximity sensors of the user device 230 may be used to determine the proximity of the user device 230 to the user 302. The proximity sensor could be of different type such as Capacitive, Inductive, Photoelectric, Doppler effect, Magnetic, electromagnetic, optical (e.g. based on mobile device's camera), ultrasonic, hall effect, or the like, used to determine a distance 308 between the user device 230 and the user 302, to determine that the distance 308 between the user device 230 and the user 302 is at least greater than a predetermined threshold, or to determine that the user device 230 is located in the second position 306 (away from the user) vs. the first position 304.

In one aspect of the present solution, there may exist one or more discrete, predetermined proximity thresholds and corresponding maximum uplink powers. In a first example, there may exist a single threshold and when the user device 230 is less than then the threshold distance to the user, a first maximum uplink power may be configured and when the user device 230 is greater than the threshold distance to the user, a second maximum uplink power may be configured, wherein the second maximum uplink power is greater than the first maximum uplink power. In a second example, there may exist a first threshold distance and second threshold distance; a first maximum uplink power is configured when the user device 230 is less than the first threshold distance to the user, a second maximum uplink power is configured when the user device 230 is greater than the first threshold distance but less than the second threshold distance, and a third maximum uplink power is configured when the user device 230 is greater than the second threshold distance. In another aspect, the maximum uplink power may be based on the distance from a user, without the use of thresholds. For example, a maximum uplink power may be defined based on any distance from a user such that the maximum uplink power gradually but consistently increases as the distance from a user increase (e.g., if the maximum uplink power may be increased at a rate of 1 dBm per foot distance from the user and the default maximum uplink power is 26 dBm, then the user device may be configured to increase maximum uplink power level gradually and consistently as the user moves the user device 230 away from them).

Figure 3A:
FIGS. 3A-3B illustrate a representation of a user utilizing a UE engaged in extended range communication in accordance with aspects herein.
Figure 3B:
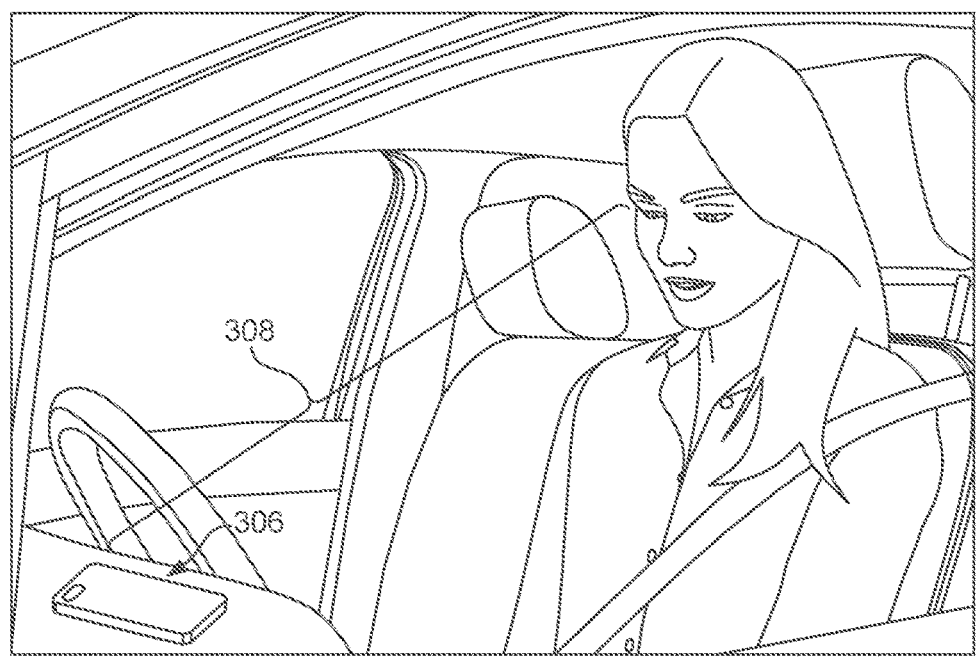

With reference to FIGS. 2-3B, an illustrative example of how the invention is carried out is provided. The user device 230 may be used in a jurisdiction that prohibits transmissions of greater than 26 dBm whenever the user device is within a few inches of the user 302's head/body. The user device 230 may receive the second set of downlink signals 250 from the second base station 220, wherein the second base station is a satellite base station. The user device 230 may, because the user 302 is in a remote area, not have any other candidate base stations to select, so it selects the second base station 220 and attempts to connect thereto. The user device 230 may communicate or attempt to communicate the second set of uplink signals 252 to the second base station 220; however, because the second distance 254 is too great or the conditions along the second distance 254 are too poor, the transmission of the second set of uplink signals 252 at an uplink power of up to 26 dBm does not result in the effective reception of the second set of uplink signals 252 by the second base station 220. Once it is determined that the user 302 has moved the user device beyond a predetermined threshold proximity from the first position 304 (whether by determining the distance 308 between the user device 230 and the user 302 is greater than the predetermined threshold or determining that the user device has been placed in the second position 306 which is associated with a location that is greater than the predetermined threshold), the maximum uplink power is increased from 26 dBm to a higher level (e.g., 29, 32, 35, or 38 dBm). With the higher maximum uplink power level, the user device 230 may continue its iterative process of transmitting the second set of uplink signals 252 with increasingly higher uplink power until an effective connection is established between the user device 230 and the second base station 220.

Figure 4:
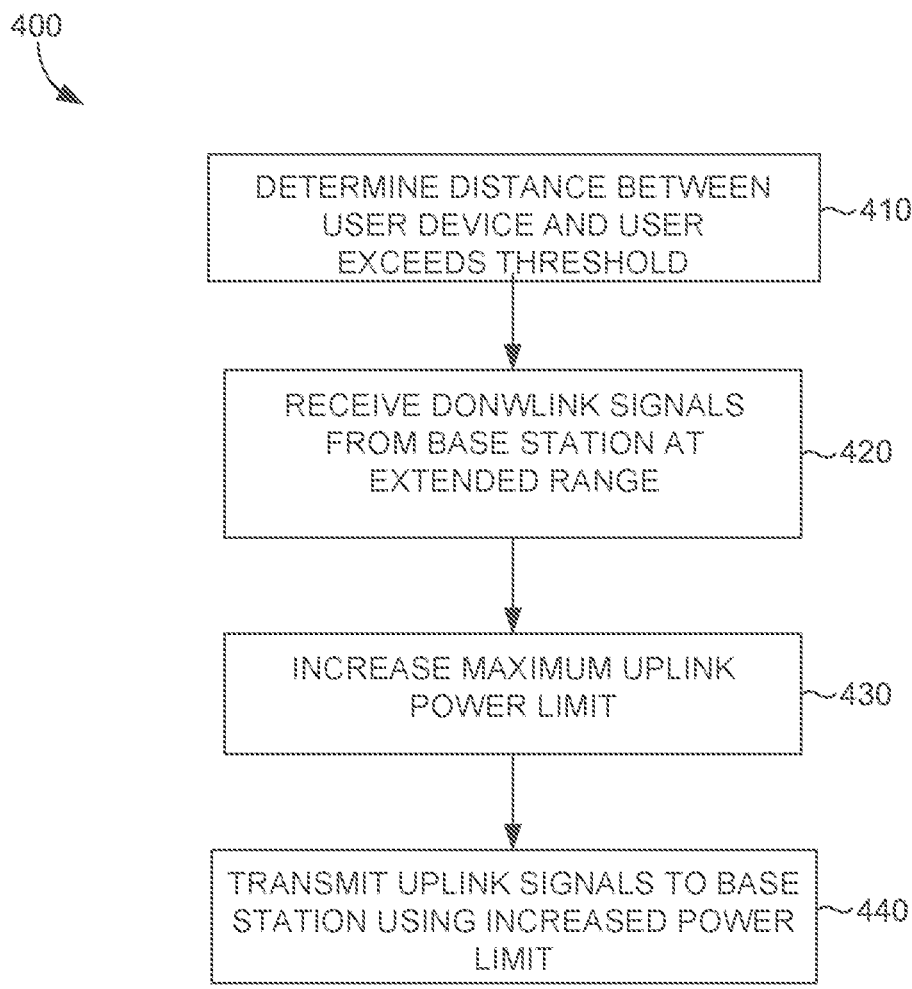
FIG. 4 depicts a flow diagram of an exemplary method for uplink power management for extended range communication, in accordance with aspects herein.

Turning now to FIG. 4 a flow chart is provided for a method of managing uplink power for extended range communication. At a first step 410, it is determined that a distance between a user device, such as the user device 230 of FIGS. 2-3B is greater than a predetermined threshold distance from a user such as user 302 of FIGS. 3A-3B, in accordance with any one or more aspects described herein. At a second step 420, a downlink signal is received from a base station indicating that the user device may attempt to attach to the base station. At a third step 430, the maximum uplink power is increased from a first level to a second, higher, level based on the determination at step 410, in accordance with any one or more aspects descried herein. At a fourth step 440, the user device communicates one or more uplink signals to the base station, wherein the uplink transmission power is less than or equal to the maximum uplink power set in the third step 430.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for managing uplink maximum transmission power in a user equipment (UE), the method comprising:
    receiving a downlink signal from a base station;
    determining an uplink power to communicate an uplink signal to the base station;
    determining that the uplink power is greater than a first maximum power limit associated with handheld operation of the UE and less than a second maximum power limit;
    determining, using one or more sensors, that a distance between the UE and a user is greater than a pre-determined threshold distance; and
    increasing a maximum uplink power limit of the UE from the first maximum power limit to the second maximum power limit.

2. The method of claim 1, wherein the one or more uplink signals are transmitted using an uplink power between the first maximum power limit and the second maximum power limit.

3. The method of claim 1, wherein determining that the UE is greater than a pre-determined threshold distance to a user comprises receiving an input from the user via a user interface of the UE and expiration of an input-triggered timer.

4. The method of claim 1, wherein determining that the UE is greater than a pre-determined threshold distance to a user further comprises determining that the user has performed an action to place the UE in a second position, the second position being greater than the pre-determined threshold distance to the user.

5. The method of claim 4, wherein the action comprises coupling the UE to a docking station.

6. The method of claim 4, wherein the action comprises coupling the UE to a charging pad.

7. The method of claim 4, wherein the second position is on a dashboard, the action comprises receiving an indication by the user via a user interface of the UE that the user is placing the UE in the second position, and wherein determining that the UE is greater than a pre-determined threshold distance to a user further comprises using one or more sensors to confirm a change in position has occurred within a threshold amount of time of receiving the indication.

8. The method of claim 2, wherein the base station is extra-terrestrial.

9. The method of claim 1, wherein determining the UE is greater than the pre-determined threshold distance to the user comprises:
    determining, using a proximity sensor, that the UE is within a predetermined threshold distance of the user at a first time when the UE is in a first position;
    determining, using a motion sensor, that the UE has moved from the first position to a second position at a second time, the second time subsequent to the first time, wherein the motion sensor comprises at least one of magnetometer, a gyroscope, and an accelerometer; and
    determining, using the proximity sensor, that the UE is greater than the predetermined threshold distance from the user at the second time and in the second position.

10. A system for managing uplink maximum transmission power, the system comprising:
    a wireless telecommunication network comprising a plurality of base stations, including a first base station configured to transmit a downlink signal to a user equipment (UE) and receive an uplink signal from the UE;

one or more networked computer processing components configured to perform a method comprising:

communicating a set of downlink signals to the UE;

determining, by the first base station, that an uplink connection between the UE and the first base station comprises one or more network parameters below a pre-determined threshold;

communicating an instruction from the first base station to the UE to utilize an extended-range communication mode, wherein the extended-range communication mode comprises the UE determining that a distance between the UE and a user exceeds a predetermined threshold and increasing a maximum uplink power from a first value to a second value, the second value being greater than the first value; and receiving a set of uplink signals at the first base station from the UE while the UE is utilizing the extended-range communication mode.

11. The system of claim 10, wherein the first base station is extra-terrestrial.

12. The system of claim 10, wherein the one or more networked computer processing components are further configured to determine that one or more channel conditions between the first base station and the UE are below a predetermined threshold.

13. One or more non-transitory computer readable media having instructions stored thereon that, when executed by one or more computer processing components, cause a user equipment (UE) to perform a method for managing uplink transmission power, the method comprising:

receiving a downlink signal from a base station;

based at least in part on a determination that a UE is located greater than a predetermined threshold distance from a user, modifying a default maximum uplink power value from a first value to a second value, wherein the second value is greater than the first value, wherein the determination is based at least in part on sensor data from a camera of the UE; and communicating an uplink signal to the base station using an uplink transmission power greater than the first value.

14. The one or more non-transitory computer readable media of claim 13, wherein the determination that the UE is located greater than a predetermined threshold distance from a user comprises using one or more sensors of the UE to determine a distance between the user and the UE and that distance is greater than the pre-determined threshold distance.

15. The one or more non-transitory computer readable media of claim 13, wherein determining that the UE is greater than a pre-determined threshold distance to a user further comprises determining that the user has performed an action to place the UE in a second position, the second position being greater than the pre-determined threshold distance to the user.

16. The one or more non-transitory computer readable media of claim 13, wherein the base station is extra-terrestrial.

* * * * *